United States Patent [19]

Kahle et al.

[11] Patent Number: 5,732,005
[45] Date of Patent: Mar. 24, 1998

[54] SINGLE-PRECISION, FLOATING-POINT REGISTER ARRAY FOR FLOATING-POINT UNITS PERFORMING DOUBLE-PRECISION OPERATIONS BY EMULATION

[75] Inventors: James Allan Kahle; Tai Dinh Ngo, both of Austin; Aubrey Deene Ogden, Round Rock; Michael Putrino, Austin, all of Tex.; John Victor Sell, Los Altos, Calif.

[73] Assignee: International Business Machines Corporation, Armonk, N.Y.

[21] Appl. No.: 386,980

[22] Filed: Feb. 10, 1995

[51] Int. Cl.$^6$ .................. G06F 7/00; G06F 7/38
[52] U.S. Cl. ........................ 364/748; 364/736.5
[58] Field of Search ................. 364/715.03, 736.5, 364/748, 736

[56] References Cited

U.S. PATENT DOCUMENTS

| | | | |
|---|---|---|---|
| 4,135,249 | 1/1979 | Irwin | 364/758 |
| 4,403,284 | 9/1983 | Sacarisen et al. | 395/800 |
| 4,476,537 | 10/1984 | Blau et al. | 364/748 |
| 4,620,292 | 10/1986 | Hagiwara et al. | 364/748 |
| 4,748,580 | 5/1988 | Ashton et al. | 364/736 |
| 4,785,412 | 11/1988 | Tran | 364/761 |
| 4,805,128 | 2/1989 | Nelson et al. | 364/715.03 |
| 4,901,233 | 2/1990 | Liptay | 395/375 |
| 5,019,961 | 5/1991 | Addesso et al. | 364/192 |
| 5,027,272 | 6/1991 | Samuels | 395/650 |
| 5,140,687 | 8/1992 | Dye et al. | 395/500 |
| 5,197,005 | 3/1993 | Shwartz | 364/419.13 |
| 5,274,679 | 12/1993 | Abe et al. | 375/370 |
| 5,317,526 | 5/1994 | Urano et al. | 364/715.03 |
| 5,341,506 | 8/1994 | Nohmi et al. | 395/800 |

FOREIGN PATENT DOCUMENTS

| | | |
|---|---|---|
| 0 529 787 A2 | 7/1992 | European Pat. Off. . |
| 0 586 767 A1 | 9/1992 | European Pat. Off. . |
| 0 576 410 A2 | 6/1993 | European Pat. Off. . |

*Primary Examiner*—Chuong D. Ngo
*Attorney, Agent, or Firm*—Michael A. Davis; Andrew J. Dillon

[57] ABSTRACT

A single-precision floating-point register array for a floating-point execution unit that performs double-precision operations by emulation is provided. The register array comprises a plurality of single-precision floating-point registers and a storage device that stores one or more status bits in association with each of the plurality of registers; the status bits associated with each register indicate either that the associated data register contains single-precision or integer data, or that the data for the associated register is contained in an emulated register in memory that is mapped to the associated register. When a register is a source for an operation, the status bits associated with the register are checked and the required operand data for that register is read from the register or from an emulated register mapped to that register, as a function of the state of the status bits.

13 Claims, 3 Drawing Sheets

SINGLE-PRECISION, FLOATING-POINT REGISTER ARRAY FOR FLOATING-POINT UNITS PERFORMING DOUBLE-PRECISION OPERATIONS BY EMULATION

BACKGROUND OF THE INVENTION

1. Technical Field

The present invention relates in general to computer processors and in particular to floating-point register arrays in microprocessors. Still more particularly, the present invention relates to a single-precision register array and method for performing double-precision operations by emulation in a microprocessor.

2. Description of the Related Art

Large percentages of modern personal computer systems are designed with double-precision floating-point registers compliant with the ANSI/IEEE Standard 754-1985 for binary floating-point arithmetic. Consequently, much of the available personal computer floating-point software is designed to operate in a double-precision architecture. Such code assumes it is being executed on a double-precision machine having double-precision registers. When designing low-cost microprocessors having single-precision floating-point units, double-precision operations are executed by emulation routines and are implemented using double-precision floating-point register arrays in the hardware. This is necessary so that the emulation routines have access to their required double-precision operands. Single-precision data are either converted to a double-precision representation or saved in a portion of the double-precision register. Unfortunately, in many cases, a double-precision floating-point register array is too expense to be utilized in such a low-cost microprocessor. It would be desirable to provide a single-precision floating-point register array that enables double-precision operations to be performed by emulation.

SUMMARY OF THE INVENTION

According to the present invention, a single-precision floating-point register array for a floating-point execution unit performing double-precision operations by emulation is provided. The register array comprises a plurality of single-precision floating-point registers and a storage device. The storage device stores one or more status bits in association with each of the plurality of registers, the one or more status bits associated with each register indicating either that the associated data register contains single-precision or integer data, or that the data for the associated register is contained in an emulated register in memory that is mapped to the associated register. When a register is a source for an operation, the one or more status bits associated with the register are checked. The required operand data for that register is then read from the register or from an emulated register mapped to that register, as a function of the state of the one or more status bits.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
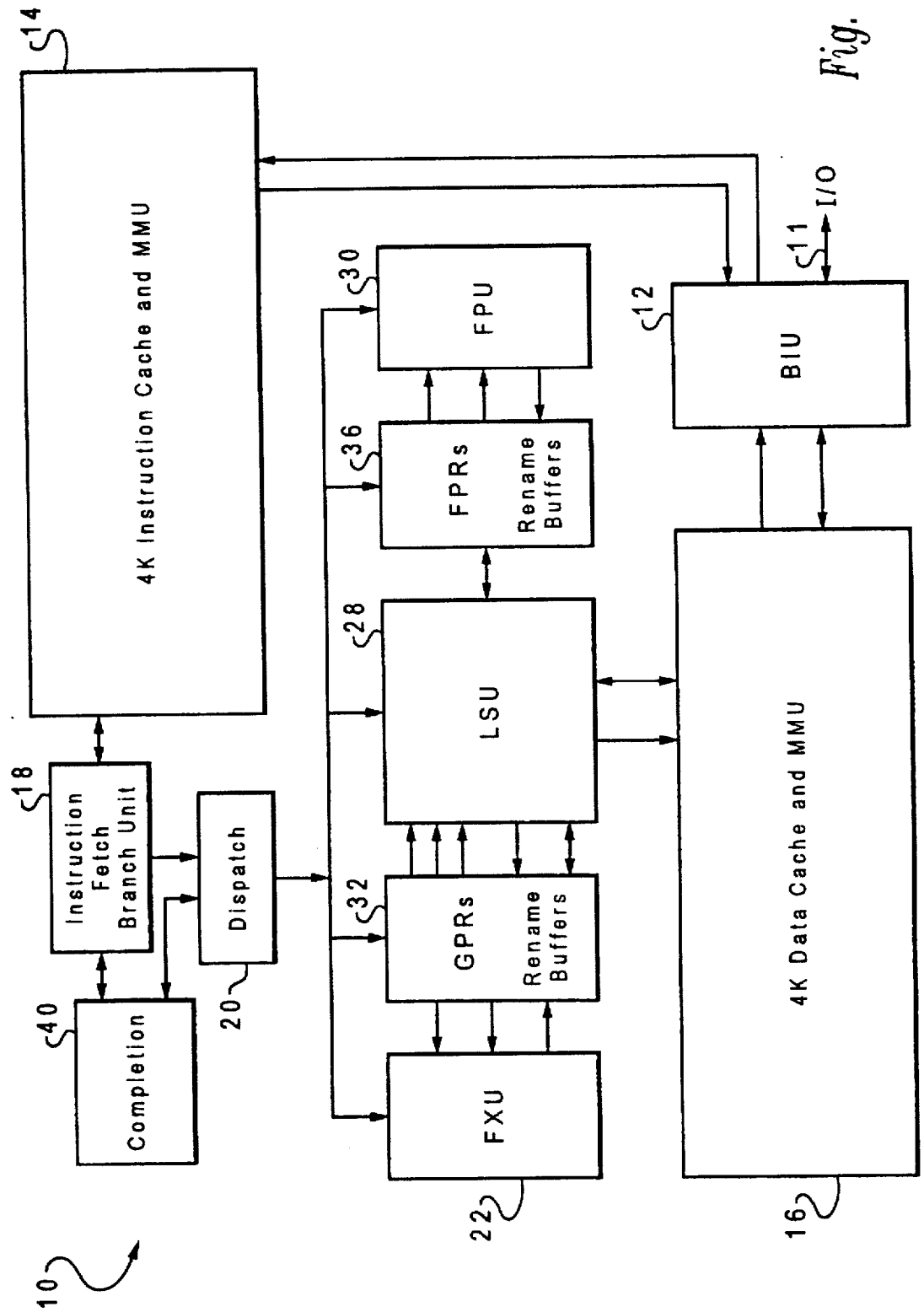
FIG. 1 is a block diagram of a processor, for processing information according to a preferred embodiment of the present invention.

FIG. 1 is a block diagram of a processor, indicated generally at 10, for processing information according to a preferred embodiment of the present invention. In the preferred embodiment, processor 10 is a single integrated circuit superscaler microprocessor. Accordingly, as discussed further hereinbelow, processor 10 includes various units, registers, buffers, memories, and other sections, all of which are formed by integrated circuitry. Also, in the preferred embodiment, processor 10 operates according to reduced instruction set computing (RISC) techniques. As shown in FIG. 1, a system bus 11 is connected to a bus interface unit (BIU) 12 of processor 10. BIU 12 controls the transfer of information between processor 10 and system bus 11.

BIU 12 is connected to an instruction cache 14 and to a data cache 16 of processor 10. A high-speed cache, such as instruction cache 14 or data cache 16, enables relatively fast access to a subset of data or instructions which were previously transferred from system memory to the cache, and thus improves the speed of operation of the data processing system. Instruction cache 14 outputs instructions to a branch unit 18. In response to such instructions from instruction cache 14, branch unit 18 selectively outputs instructions to other execution circuitry of processor 10.

The transfer of operands or instructions between system memory connected to system bus 11 and the data or instruction cache is usually effected in fixed-length units called blocks. A block of data may be transferred in varying sizes such as tracks, sectors, lines, bytes, etc., as are known in the art. When a memory access by the branch unit 18 allows retrieval of necessary data from the data cache 16, such success is called a cache "hit", and when retrieval of necessary data cannot be performed in the cache, and so must be performed from system memory or another processor cache, such failure is called a "miss".

In addition to branch unit 18, in the preferred embodiment the execution circuitry of processor 10 includes multiple execution units, namely a fixed point unit (FXU) 22, a Load-Store unit (LSU) 28, and a floating point unit (FPU) 30. FXU 22 and LSU 28 input their source operand information from general purpose architectural registers (GPRs) 32. FXU 22 and LSU 28 output results (destination result information) of their operations for storage at selected entries in fixed point rename buffers in GPRs 32.

Moreover, LSU 28 inputs source operand information from floating point architectural registers (FPRs) 36. FPU 30 inputs its source operand information from FPRs 36, and LSU 28. LSU 28 and FPU 30 output results (destination result information) of their operations for storage at selected entries in floating point rename buffers in FPRs 36.

In response to the instructions input from instruction cache 14, branch unit 18 selectively dispatches, through dispatch unit 20, the instructions to selected ones of execution units 22, 28, 30, 32, and 36. Each execution unit executes one or more instruction of a particular class of instructions. For example, FXU 22 executes a first class of fixed point mathematical operations on source operands, such as addition, subtraction, ANDing, ORing and XORing. FPU 30 executes floating point operations on source operands, such as floating point multiplication and division operations.

In response to a Load instruction, LSU 28 inputs information from data cache 16 and copies such information to selected ones of rename buffers in GPRs 32 and FPRs 36 and/or FPU 30. If such information is not stored in data cache 16, then data cache 16 inputs (through BIU 12 and system bus 11) such information from a system memory connected to system bus 11. Moreover, data cache 16 is able to output (through BIU 12 and system bus 11) information from data cache 16 to system memory connected to system bus 11.

In response to a Store instruction from branch unit 18, the LSU 28 generates the store address, and reads data from a selected one of GPRs 32 and FPRs 36. The store address and the data are then written to the data cache when the store instruction is ready to complete.

As information is stored at a selected one of rename buffers in GPRs 32, such information is associated with a storage location (e.g. one of GPRs 32) as specified by the instruction for which the selected rename buffer is allocated. Information stored at a selected one of the rename buffers is copied to its associated one of GPRs 32 in response to signals from branch unit 18. Branch unit 18 directs such copying of information stored at a selected one of the rename buffers in response to "completing" the instruction that generated the information, as indicated by completion unit 40. In the preferred embodiment, processor 10 may have multiple completions of instructions during a single cycle of processor 10.

As information is stored at a selected one of the rename buffers in FPRs 36, such information is associated with one of FPRs 36. Information stored at a selected one of the rename buffers is copied to its associated one of FPRs 36 in response to signals from branch unit 18. Branch unit 18 directs such copying of information stored at a selected one of the rename buffers in response to "completing" the instruction that generated the information, as indicated by completion unit 40. In the preferred embodiment, processor 10 may have multiple completions of instructions during a single cycle of processor 10.

Processor 10 achieves high performance by processing multiple instructions simultaneously at various ones of execution units 22, 28, 30, 32, and 36. Accordingly, each instruction is processed as a sequence of stages, each being executable in parallel with stages of other instructions. Such a technique is called "pipelining". An instruction is normally processed as five stages, namely fetch, decode/dispatch, execute, finish, and completion.

In the fetch stage, branch unit 18 selectively inputs (from instructions cache 14) one or more instructions from one or more memory addresses storing the sequence of instructions. In the decode/dispatch stage, branch unit 18 decodes up to three fetched instructions and selectively dispatches up to three decoded instructions to selected (in response to the decoding in the decode stage) ones of execution units 22, 28, 30, 32, and 36 after reserving a rename buffer entry for each dispatched instructions' result (destination operand information). Processor 10 dispatches instructions in order of their programmed sequence. The branch unit assigns a unique tag to each instruction as the instruction identifier (IID).

In the execute stage, execution units execute their dispatched instructions as soon as the operands are ready. In the finish stage, execution units store output results (destination operand information) at selected entries in rename buffers as discussed further hereinabove. Each execution unit signals the branch unit that it has finished executing an instruction. The execution unit sends the instruction status along with the IID back to the branch unit.

Single-precision floating-point multiplies, multiply-adds, adds, and subtracts will execute in a three stage pipeline with three-cycle completion latency allowing a single-precision instruction to initiate and complete on each cycle. Single-precision divides requires multiple cycles to complete. All double-precision operations and any operation involving double-precision operands are handled via emulation routines. And, double-precision operations will require more cycles due to emulation.

Figure 2:
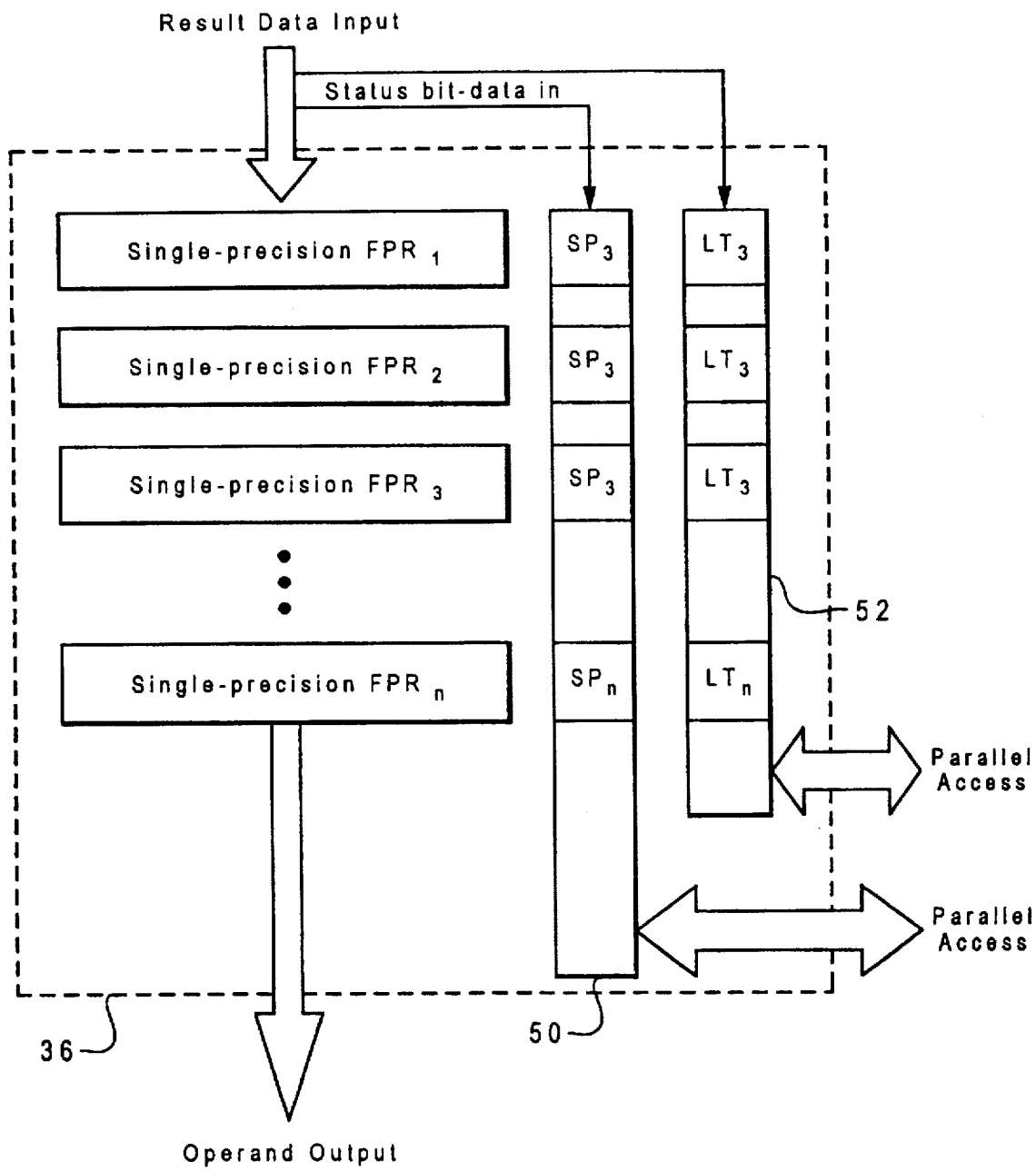
FIG. 2 depicts a single-precision floating-point register array, according to a preferred embodiment of the present invention.

Referring now to FIG. 2, there is depicted a single-precision floating-point register array, according to a preferred embodiment of the present invention. Each floating-point register (FPR) of the floating-point register array (FPRs) 36 is a single-precision register holding a 32-bit number. The single-precision floating-point register array 36 contains "n" single-precision floating-point registers (1 through n) that only support a single-precision operand or integer value. Single-precision operand information is received by the FPRs 36 from FPU 30 and LSU 28 through input ports generally indicated in FIG. 2 by the designation "Result Data Input". Output from FPRs 36 to FPU 30 and LSU 28 are indicated generally in FIG. 2 by "Operand Output".

Also included in FPRs 36 are two 32-bit special-purpose registers (SPR) 50 and 52. Each bit of each SPR corresponds to a different 32-bit FPR in FPRs 36. These two mutually-exclusive read/writable status bits are logically concatenated onto each of the hardware FPRs in FPRs 36 to indicate whether valid single-precision or integer data resides in the associated FPR. The bits contained in SPR 50 are called SP bits; and a set SP bit indicates that the value contained in the register associated with that bit is a single-precision number. The bits contained in SPR 52 are called LT bits; and a set LT bit indicates that the associated floating-point register contains integer data. Thus, if either the SP-bit or the LT-bit corresponding to a particular FPR is set, then the associated register contains valid data.

If neither bit is set, the operand data for that particular register is invalid in hardware and, instead, has been saved in an analogous emulated double-precision FPR in memory. This occurs when the data targeted to be stored in the particular register is out of the single precision range. In that case, both the SP and LT status bits are reset (i.e. "off"), and the data is saved in an emulated register in memory that is mapped to the particular register. In the emulated register, the data is stored as a double-precision number. When a FPR having both the SP-bit and LT-bit reset is the source register of a floating-point operation, the data for the operation is retrieved from the emulated double-precision FPR, and the operation receiving the operands is performed by an emulation routine. Note that having both bits set (i.e. "On") is an invalid state and is not allowed.

Referring again to FIG. 2, as data is input into FPRs 36 through the Result Data Input, the associated SP and LT bits in SPRs 50 and 52, respectively, are appropriately set, as is required by the associated target register's data. If SP=0 and LT=1, the operand data contained in the associated register is integer data. If SP=1 and LT=0, the data contained in the associated FPR is designated single-precision floating-point data. If SP=0 and LT=0, the data held in the associated FPR is not valid and a memory image of the data is held as a double-precision number in an emulated floating-point register in memory.

Every bit of SPRs 50 or 52 may also be accessed and reloaded simultaneously, in parallel, using floating-point special purpose instructions, including a move-from-special-register (mfspr) instruction and a move-to-special-register (mfspr) instruction. These instructions allow all bits of the SPRs to be read/written simultaneously via a parallel bus structure and are issued by double-precision emulation software performing double-precision operations to obtain parallel access to SPRs 50 and 52. When a special purpose read/write instruction is addressed to SPR 50 or SPR 52, a parallel access to the SPR is made via its Parallel Access.

Figure 3:
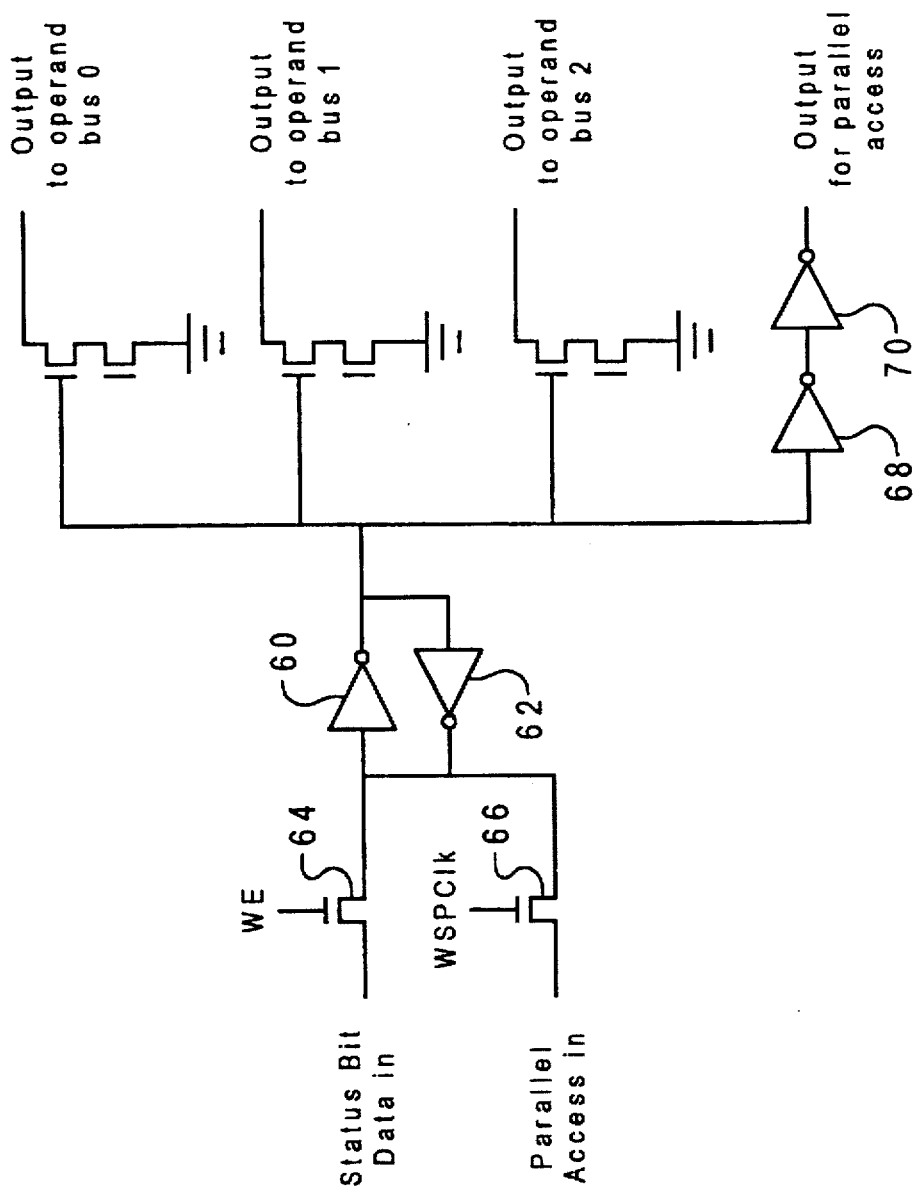
FIG. 3 depicts a schematic diagram for a single cell of a special purpose register (SPR), according to a preferred embodiment of the present invention.

Referring now to FIG. 3, there is depicted a schematic diagram for a single cell of a special purpose register (SPR), according to a preferred embodiment of the present invention. Every status bit of SPRs 50 and 52 is held in a cell circuit such as the one shown in FIG. 3. For example, for a 32-bit SPR there will be 32 cells identical to the cell shown in FIG. 3, whether it is SPR 50 or SPR 52. Each cell holds a status bit of the SPR in a latch formed by inverters 60 and 62. As result data is written into a FPR, the LSU or FPU that originates the result data stores the appropriate SP and LT bits in the corresponding SP and LT cells of SPRs 50 and 52. The status bit (SP or LT) is input to the cell at the "Status Bit Data in", located at the source/drain of transistor 64. Transistor 64 is being clocked by the Write Enable (WE) signal, which allows the status bit to be held in the latch formed by inverter 60 and 62. In addition, when writing all 32 bits of the SPR in parallel, in response to the special purpose mtspr instruction, each cell's status bit is input at the source/drain of transistor 66 ("Parallel Access in") and is clocked into the latch formed by inverter 60 and 62 by the Write Special-Purpose Clock (WSPClk).

When a FPR is a source register of an operation, the execution unit performing the operation checks the status bits of the source register. As shown in the preferred embodiment of FIG. 3, each of these status bits is output onto every operand bus sent to the execution unit. In the preferred embodiment, execution units are capable of performing arithmetic operations having three operands. Accordingly, the status bit is output over three operand buses (0-2), as shown in FIG. 3, so that the execution unit receives an indication of the status bit, regardless of the arithmetical position of the operand data contained in the associated FPR. Also, the latched status bit is output through buffers 68 and 70 for parallel access of the entire SPR. Each of these parallel access outputs from all 32 cells of a SPR form a 32-bit bus that is accessed in response to a special purpose mfspr instruction.

As an example of how the single-precision floating-point register array of a preferred embodiment of the present invention enables the performance of a double-precision operation by emulation, consider an example of a floating-point Add-Double operation on two operands. Because FPU 30 in the preferred embodiment is a single-precision unit, the double-precision operation is performed by emulation code. Suppose the operation assumes the two operands to be added are contained in source register 1 and source register 2. The status bits of source register 1 are checked by an emulation routine using the mfspr instruction and it is found that the operand data is either single-precision or integer data (either SP or LT is set). Thus, the contents of source register 1 are sent to the LSU and stored out to memory as a double-precision number by an emulation routine. Also, the status bits of source register 2 are checked by the emulation routine using the mfspr instruction and it is found that both status bits (SP and LT) are reset. Thus, the operand data for this source register is already a double-precision floating-point number contained in an emulated double-precision register mapped to the source register. The emulation code executes the floating-point Add-double by adding the double-precision operand data for source register 1 to the double-precision data already stored in an emulated register for source register 2.

The emulation code then attempts to store the results in a target register 3 contained in FPRs 36. Before loading the results in target register 3, it is determined whether the result is within the single-precision range. If it is, the result is converted to a single-precision value and stored in the target register and the associated SP-bit is set to indicate that it is valid single-precision data. (LT is set to 0 because the stored result is not integer data.) If the results of the emulated double-precision operation is not within the single-precision range, the result is stored in an emulated double-precision register in memory and the status bits for target register 3 are reset, indicating that the FPR data in hardware is invalid and that the operand data is contained in the emulator register.

A Load-Store Unit capable of performing the operations necessary to support the single-precision floating-point register array of the present invention in performing double-precision operations by emulation is described in U.S. patent application Ser. No. 08/386,979, filed of even date herewith and assigned to the same assignee as the claimed invention herein. That application describes the conversion of data from/to single-precision to/from double-precision in a LSU, including the testing of data to determine if it is in single-precision range and can be stored in a single-precision register, or if it is out of single-precision range and must be stored in an emulated register.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

We claim:

1. A method of indicating the precision and location of operand data in a data processing system, the method comprising the step of:

writing status bits, associated with a plurality of registers, in a storage device, wherein one or more status bits are written in association with each of the plurality of registers, the one or more status bits associated with each register indicating either that the associated register contains data that is not double-precision, or that the data for the associated register is contained in an emulated register in a memory that is mapped to the associated register.

2. A method of indicating the precision and location of operand data in a data processing system, according to the method of claim 1, further comprising the step of reading the one or more status bits associated with a register and reading the data for that register from either the register or from an emulated register mapped to that register, wherein whether the register is read or the emulated register is read is a function of the state of the one or more status bits.

3. A method of indicating the precision and location of operand data in a data processing system, according to the method of claim 1, further comprising the step of writing the status bits of the plurality of floating-point registers simultaneously, in response to a special-purpose instruction.

4. A method of indicating the precision and location of operand data in a data processing system, according to the method of claim 1, further comprising the step of reading the status bits of the plurality of floating-point registers simultaneously, in response to a special-purpose instruction.

5. A method of indicating the precision and location of operand data in a data processing system according to claim 1, wherein two or more bits are written in association with each of the plurality of registers, and wherein the two or more status bits associated with each register indicate either that the associated register contains single-precision or integer data, or that the data for the associated register is contained in an emulated register in a memory that is mapped to the associated register.

6. A single-precision floating-point register array that is utilized by a floating-point execution unit that performs double-precision operations by emulation, comprising:

a plurality of single-precision floating-point registers;

a storage device for storing status bits, wherein one or more status bits are stored in association with each of the plurality of registers, the one or more status bits associated with each register indicating either that the associated register contains data that is not double-precision, or that the data for the associated register is contained in an emulated register in a memory that is mapped to the associated register.

7. A single-precision floating-point register array that is utilized by a floating-point execution unit that performs double-precision operations by emulation, according to claim 6, wherein the storage device includes one or more special purpose registers where the status bits are stored.

8. A single-precision floating-point register array that is utilized by a floating-point execution unit that performs double-precision operations by emulation, according to claim 7, wherein the status bits are stored simultaneously to the one or more special purpose registers, in response to a special purpose instruction.

9. A single-precision floating-point register array that is utilized by a floating-point execution unit that performs double-precision operations by emulation, according to claim 7, wherein the status bits are read simultaneously from the one or more special purpose registers, in response to a special purpose instruction.

10. A single-precision floating-point register array that is utilized by a floating-point execution unit that performs double-precision operations by emulation, according to claim 6, wherein the status bits associated with each register indicate either that the associated register contains single-precision or integer data, or that the operand data for the associated register is contained in an emulated register in a memory that is mapped to the associated register.

11. A method of managing double-precision emulated registers and a single-precision floating-point register array, the method comprising the steps of:

if a number is within a single-precision range or is an integer, writing the result of an emulated operation into a target register and setting one or more status bits associated with the target register to indicate whether the number stored in the target register is a single-precision or an integer number;

if the number is not within the single-precision range or is not an integer, writing the result of an emulated operation into an emulated register mapped to the target register, and setting one or more status bits associated with the target register to indicate that the data for the target register is located in the emulated register;

reading the one or more status bits associated with a source register of an executing floating-point operation;

if the one or more status bits that are read indicate that the number contained in the source register is within the single-precision range or is an integer, reading the data for the executing floating-point operation from the source register; and if the one or more status bits that are read indicate that the number contained in the source register is not within a single-precision range or is not an integer, reading the data for the executing floating-point operation from an emulated register mapped to the source register.

12. A method of managing double-precision emulated registers and a single-precision floating-point register array according to the method of claim 11, further comprising the step of writing the status bits of the plurality of floating-point registers simultaneously, in response to a special-purpose instruction.

13. A method of managing double-precision emulated registers and a single-precision floating-point register array according to the method of claim 11, further comprising the step of reading the status bits of the plurality of floating-point registers simultaneously, in response to a special-purpose instruction.

* * * * *

UNITED STATES PATENT AND TRADEMARK OFFICE
CERTIFICATE OF CORRECTION

PATENT NO. : 5,732,005
DATED : March 24, 1998
INVENTOR(S) : Kahle et al.

It is certified that error appears in the above-indentified patent and that said Letters Patent is hereby corrected as shown below:

On the title page, Item [75] Inventors: please change "Johm Victor Sell" to --John Victor Sell--.

Signed and Sealed this

Fourteenth Day of July, 1998

Attest:

BRUCE LEHMAN

*Attesting Officer*     *Commissioner of Patents and Trademarks*